US012591279B2

(12) United States Patent
Fan et al.

(10) Patent No.: US 12,591,279 B2
(45) Date of Patent: Mar. 31, 2026

(54) ELECTRONICS UNIT STAND WITH MOVABLE FAN CARRIER

(71) Applicant: Hewlett-Packard Development Company, L.P., Spring, TX (US)

(72) Inventors: Yao-Wen Fan, Taipei City (TW); Yi-Hsieh Chiu, Taipei City (TW); Yu Wei Tan, Taipei City (TW); Cheng-Yan Chiang, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 484 days.

(21) Appl. No.: 18/005,242

(22) PCT Filed: Jul. 17, 2020

(86) PCT No.: PCT/US2020/042446
§ 371 (c)(1),
(2) Date: Jan. 12, 2023

(87) PCT Pub. No.: WO2022/015317
PCT Pub. Date: Jan. 20, 2022

(65) Prior Publication Data
US 2023/0244283 A1 Aug. 3, 2023

(51) Int. Cl.
*G06F 1/20* (2006.01)
*H05K 7/20* (2006.01)

(52) U.S. Cl.
CPC ..................................... *G06F 1/20* (2013.01)

(58) Field of Classification Search
CPC .................................. G06F 1/20; H05K 7/207
See application file for complete search history.

(56) References Cited

U.S. PATENT DOCUMENTS

| | | | |
|---|---|---|---|
| 6,084,769 A | 7/2000 | Moore et al. | |
| 6,191,943 B1 | 2/2001 | Tracy | |
| 6,453,378 B1 | 9/2002 | Olson et al. | |
| 6,671,177 B1 | 12/2003 | Han | |
| 7,342,783 B2 | 3/2008 | Park | |
| 2004/0130870 A1 | 7/2004 | Fleck et al. | |
| 2006/0164806 A1 | 7/2006 | Huang | |
| 2007/0047200 A1 | 3/2007 | Huang | |
| 2008/0084661 A1 | 4/2008 | Lee | |
| 2008/0174956 A1* | 7/2008 | Alex ..................... | H01L 23/467 257/E23.099 |
| 2010/0013675 A1* | 1/2010 | Bennett ............... | G06F 13/4004 341/5 |
| 2016/0239056 A1* | 8/2016 | Saroor .................. | G06F 1/1632 |
| 2017/0020031 A1 | 1/2017 | Pan et al. | |

(Continued)

FOREIGN PATENT DOCUMENTS

| | | | | |
|---|---|---|---|---|
| CN | 106766054 A | 5/2017 | | |
| CN | 109656344 A | * 4/2019 | ............. | G06F 1/203 |
| JP | 2014-192506 A | 10/2014 | | |

(Continued)

*Primary Examiner* — Mark A Connolly

(74) *Attorney, Agent, or Firm* — Quarles & Brady LLP

(57) ABSTRACT
An electronics unit (EU) stand may include a base and a fan carrier. The base is to couple to an electronics unit having heat generating components. The fan carrier supports a fan. The fan carrier is movably coupled to the base to move the fan between a first position relative to the base and second position relative to the base.

20 Claims, 12 Drawing Sheets

(56)  References Cited

U.S. PATENT DOCUMENTS

| | | | |
|---|---|---|---|
| 2019/0041935 A1* | 2/2019 | Hijazi | G06F 1/3296 |
| 2021/0165471 A1* | 6/2021 | Chen | G06F 1/206 |

FOREIGN PATENT DOCUMENTS

| | | |
|---|---|---|
| KR | 10-2001-0056542 A | 7/2001 |
| KR | 20-2008-0001652 U | 6/2008 |
| RU | 103693 U1 | 4/2011 |
| RU | 129702 U1 | 6/2013 |
| TW | M529761 U | 10/2016 |
| WO | 2019/112573 A1 | 6/2019 |

* cited by examiner

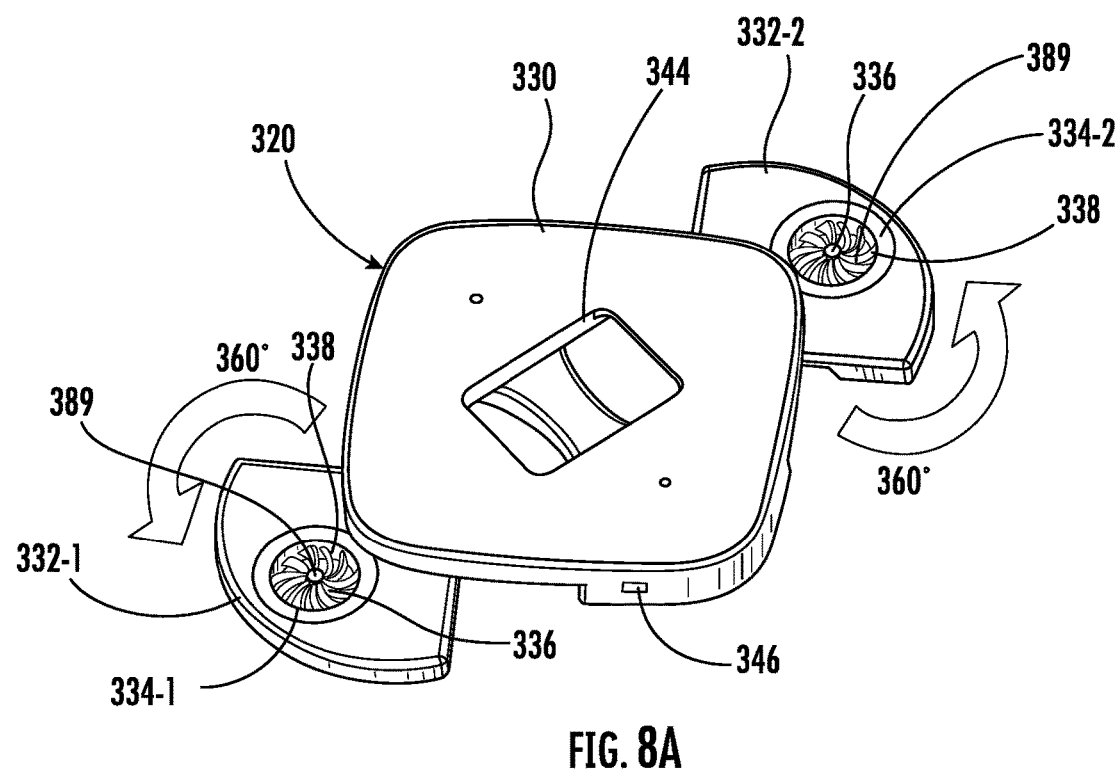
FIG. 8A
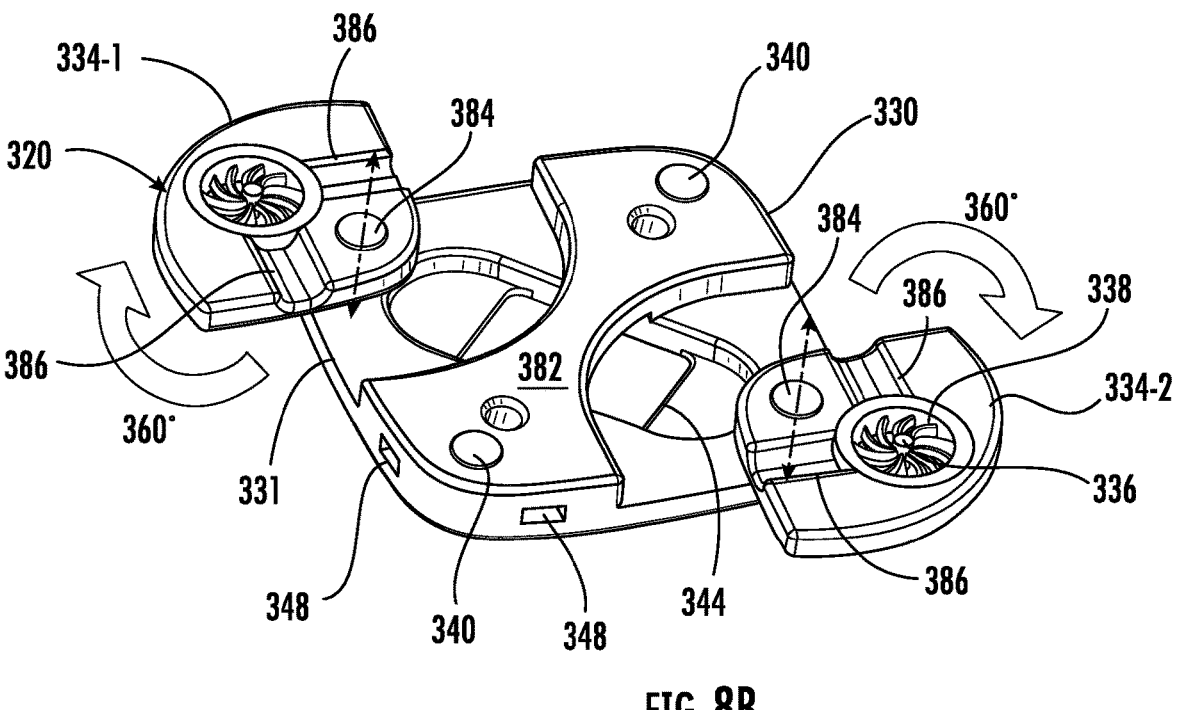
FIG. 8B

ELECTRONICS UNIT STAND WITH MOVABLE FAN CARRIER

BACKGROUND

Electronics units come in a variety of forms. For example, some electronics units are in the form of computers. Some electronics units are in the form of memory storage units. Some electronics units are in the form of modems, routers and the like. Stands are sometimes used to support the electronics units above a support surface to permit airflow between the support surface and the electronics unit.

BRIEF DESCRIPTION OF THE DRAWINGS

FIG. 8A is a top perspective view of the example EU stand of FIG. 7A with the fans in third and fourth positions.

FIG. 8B is a bottom perspective view of the example EU stand of FIG. 7A with the fans in the third and fourth positions.

Figure 1:
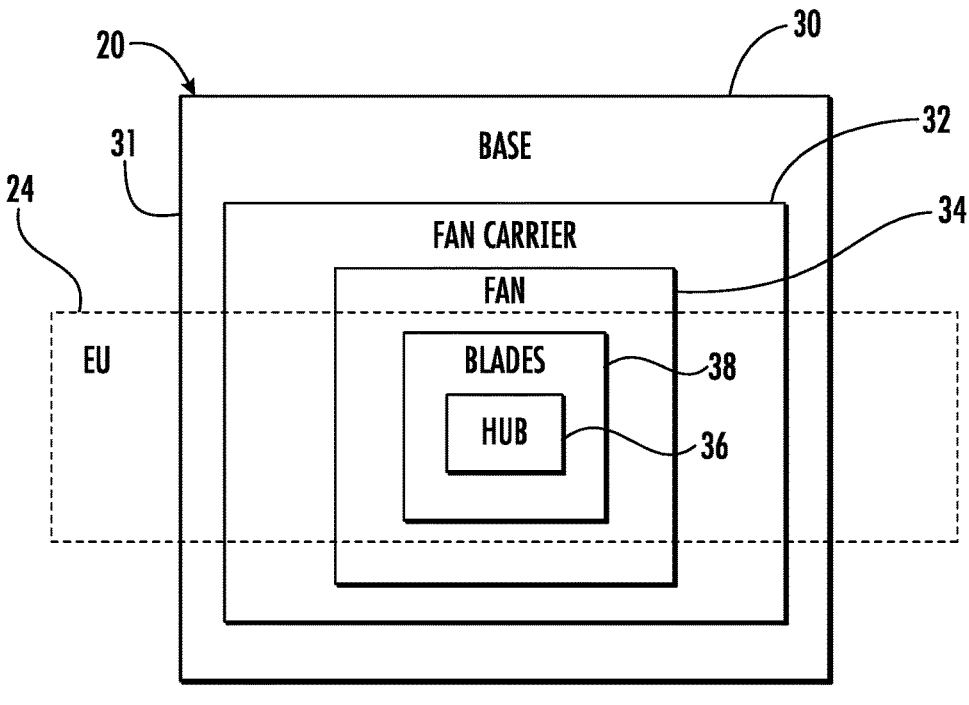
FIG. 1 is a block diagram schematically illustrating portions of an example electronics unit (EU) stand with a fan in a first position.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example electronics unit (EU) stands that are user reconfigurable to support and cool an EU unit in any one of multiple user selected orientations. The example EU stands interface with the EUs to support the EUs in one of multiple user selected orientations, such as a vertical orientation or a horizontal orientation. The example EU stands comprise a fan or multiple fans for directing air through or across the EUs to dissipate heat and cool the EUs. The example EU stands each comprise a movable fan carrier such that the fan (or fans) may be moved between different positions relative to the supported EU to accommodate the particular orientation chosen for the EU. As a result, cooling of the supported EU is enhanced.

In some implementations, the EU stands each comprise a base and a fan carrier supporting and carry a fan. The base is formed as part of the EU or is connectable to the EU to support the EU in different orientations. The fan carrier is movably coupled to the base. The fan carrier supports the fan and facilitates movement of the fan between different positions relative to the base.

In some implementations, the fan carrier is movably coupled to the base to move a hub of the fan between a first position within a perimeter of the base and a second position beyond the perimeter of the base. In some implementations, the fan carrier is movably coupled to the base to move the fan hub between a first position relative to the base in which the fan hub extends along a first axis perpendicular to a plane of the base and a second position relative to the base in which the fan hub extends along a second axis perpendicular to the plane of the base.

In some implementations, the fan carrier is pivotably coupled to the base for movement between the first position and the second position relative to the base. In some implementations, the fan carrier is pivotably coupled to the base for pivotal movement about a pivot axis parallel to the fan hub. In some implementations, the fan carrier is pivotably coupled to the base for pivotal movement about a pivot axis nonparallel to the fan hub. In some implementations, the fan carrier is translatable or slidable between the first position and the second position relative to the base.

In some implementations, the EU stand provides auxiliary functions for the EU. For example, in some implementations, the EU stand comprises an additional input/output port or multiple additional input/output ports to provide additional data communication for the EU.

For purposes of this disclosure, an EU refers to any electronic unit or device having internal components, such as resistors and the like, that generate heat. Examples of an EU include, but are not limited to, computing units, servers, memory storage units, communication units such as switches, routers and modems, and the like.

For purposes of this disclosure, a base refers to any structure that provides a platform, foot, pedestal, spacer or the like for supporting the electronics of the EU above an underlying support surface. A base may be "coupled" to the EU in a variety of manners. A base may be coupled to the EU by being formed as part of an outer housing or frame of the EU itself. A base may comprise a component distinct from the EU, wherein the base is removably or releasably connectable to the outer housing or frame of the EU. For purposes of this disclosure, the term "releasably" or "removably" with respect to an attachment or coupling of two structures means that the two structures may be repeatedly connected and disconnected to and from one another without material damage to either of the two structures or their functioning.

For purposes of this disclosure, a fan carrier refers to any structure that supports a fan or supports/forms a framework for supporting a fan. Such a fan may comprise multiple blades extending about a fan hub. Such a fan may additionally comprise a motor for driving the fan hub and blades about the axis of the fan hub.

In the example EU stands, the fan carrier is movably coupled to the base such that the fan may be moved to different positions relative to the base dependent upon the orientation chosen for the EU. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Disclosed is an example EU stand. The example EU stand may comprise a base to couple to an electronics unit having heat generating components, wherein the base has a perimeter. The example EU stand may further comprise a fan carrier supporting a fan having blades extending about a fan hub. The fan carrier is movably coupled to the base to move the fan hub between a first position within a perimeter of the base and a second position beyond the perimeter of the base.

Disclosed is an example EU stand. The example EU stand may comprise a base to be coupled to an electronics unit, wherein the base extends in a plane. The example EU stand may further comprise a fan carrier supporting a fan having blades extending about a fan hub. The fan carrier is movably coupled to the base to move the fan hub between a first position relative to the base with the fan hub extending along a first axis perpendicular to the plane and a second position relative to the base with the fan hub extending along a second axis perpendicular to the plane.

Disclosed is an example electronics system. The example electronic system may include an electronics unit having heat generating components and a stand supporting heat generating components. The stand may comprise a base having a perimeter and a fan carrier. The fan carrier supports a fan having blades extending about a fan hub. The fan carrier is movably coupled to the base to move the fan hub between a first position within a perimeter of the base and a second position beyond the perimeter of the base.

Figure 2:
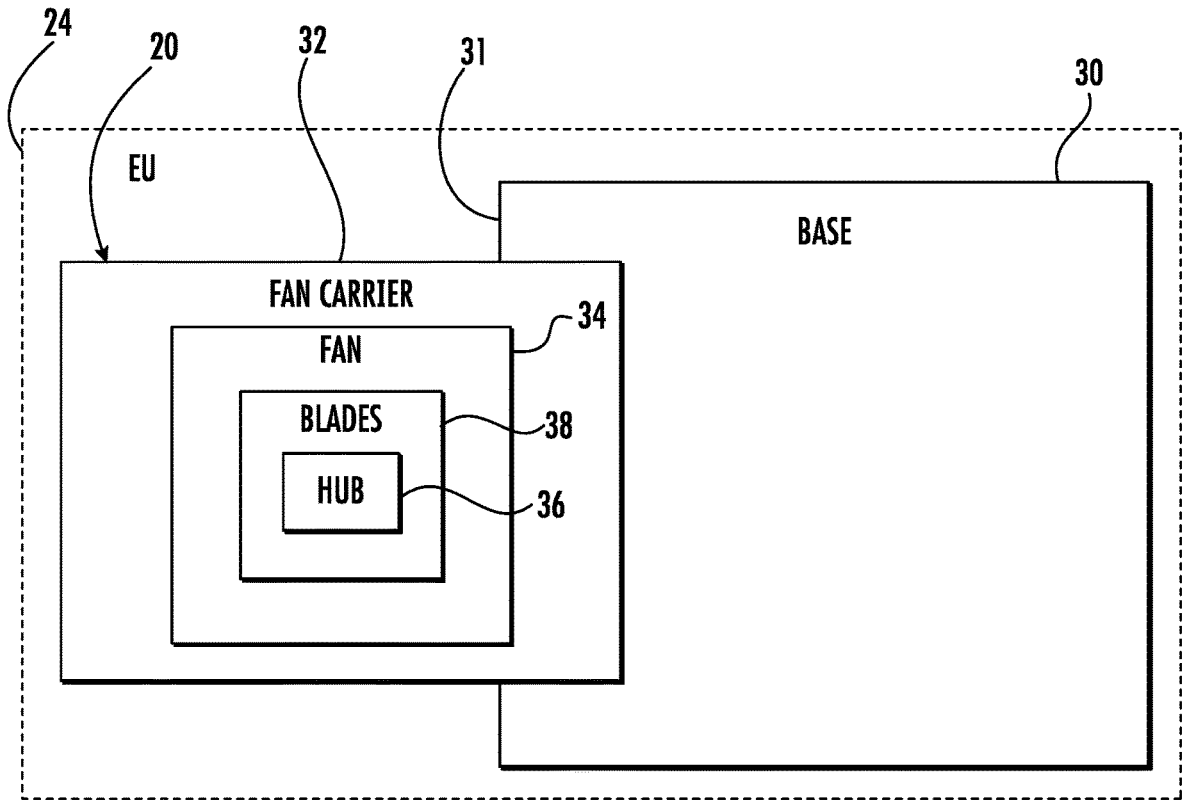
FIG. 2 is a block diagram of the example EU stand of FIG. 1 with the stand in a second position.

FIGS. 1 and 2 illustrate an example of how a fan may be moved between a first position that is within a perimeter of the stand base and a second position outside the perimeter of the stand base to accommodate different orientations of an EU. FIG. 1 is a block diagram schematically illustrating an example EU stand 20 in a first state for supporting an example EU 24 (shown in broken lines) in a first vertical orientation. FIG. 2 is a block diagram schematically illustrating the example EU stand 20 in a second different state for supporting the example EU 24 (shown in broken lines) in a second horizontal orientation. EU stand 20 comprises base 30, fan carrier 32, and fan 34.

Base 30 is to couple to EU 24 and comprises a foot, pedestal, platform or other structure for elevating and supporting EU 24 above an underlying support surface such as a floor, tabletop, desktop or the like. EU stand 20 and the supported EU 24, together, form an electronic system. EU 24 comprises heat generating components contained within an outer housing or frame. Base 30 interfaces with EU 24 to support EU 24 in one of many possible user selectable orientations, such as the vertical orientation shown in FIG. 1 or the horizontal orientation shown in FIG. 2. A vertical orientation refers to an orientation in which major dimensions of the EU 24 are located in a vertical plane. A horizontal orientation refers to an orientation in which major dimensions of the EU 24 are located in a horizontal plane. In some implementations, base 30 is integrally formed as part of a single unitary body with the outer housing or frame of EU 24. In some implementations, base 30 is a separate component that is removably or releasably connectable to EU 24.

Fan carrier 32 comprises a structure that supports fan 34. Fan 34 comprises a hub 36 which rotatably supports blades 38. Blades 38 extend from and about hub 36, wherein rotation of hub 36 and blades 38 drives air into and/or across EU 24 to dissipate heat from EU 24. Fan 34 may support a motor for rotatably driving the hub 36 and blades 38 about the axis of the hub 36.

As shown by FIGS. 1 and 2, fan carrier 32 is movably coupled to base 30 to move the fan hub 36 between a first inset position (shown in FIG. 1) that is within a perimeter 31 of base 30 and a second extended position (shown in FIG. 2) in which the fan hub 36 is beyond or outside the perimeter 31 of base 30. When in the first inset position shown in FIG. 1, fan 34 may better align with EU 24 may provide enhanced airflow to EU 24 when EU 24 is in the vertical orientation.

When in the second extended position shown in FIG. 2, fan 34 may better align with EU 24 or may provide enhanced airflow to EU 24 when EU 24 is in the horizontal orientation.

In some implementations, fan carrier 32 is pivotally coupled to base 30 for movement between the first inset position and the second extended position. In some implementations, fan carrier 32 may pivot about a pivot axis parallel to the axis of hub 36 (the axis about which fan 34 is rotatably driven). In some implementations, fan carrier 32 may pivot about a pivot axis that is nonparallel to the axis of fan hub 36. For example, fan carrier 32 may flip between the first inset position and the second extended position. In some implementations, fan carrier 32 may translate or slide between the first inset position and the second extended position.

Figure 3:
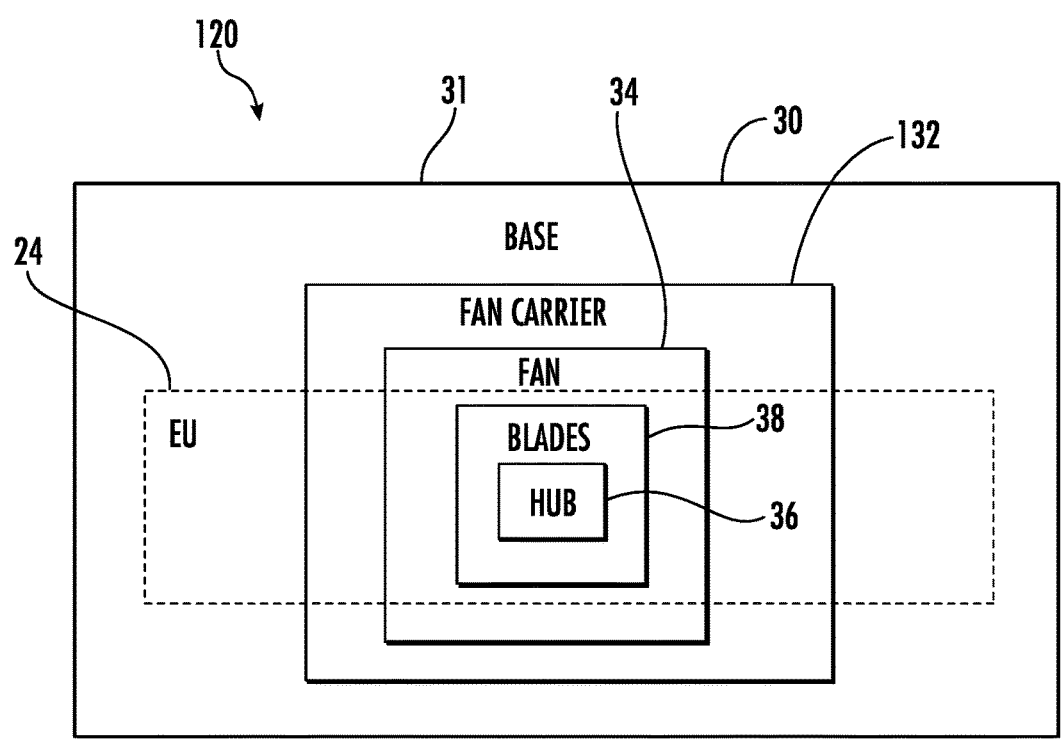
FIG. 3 is a block diagram schematically illustrating portions of an example EU stand with a fan in a first position.
Figure 4:
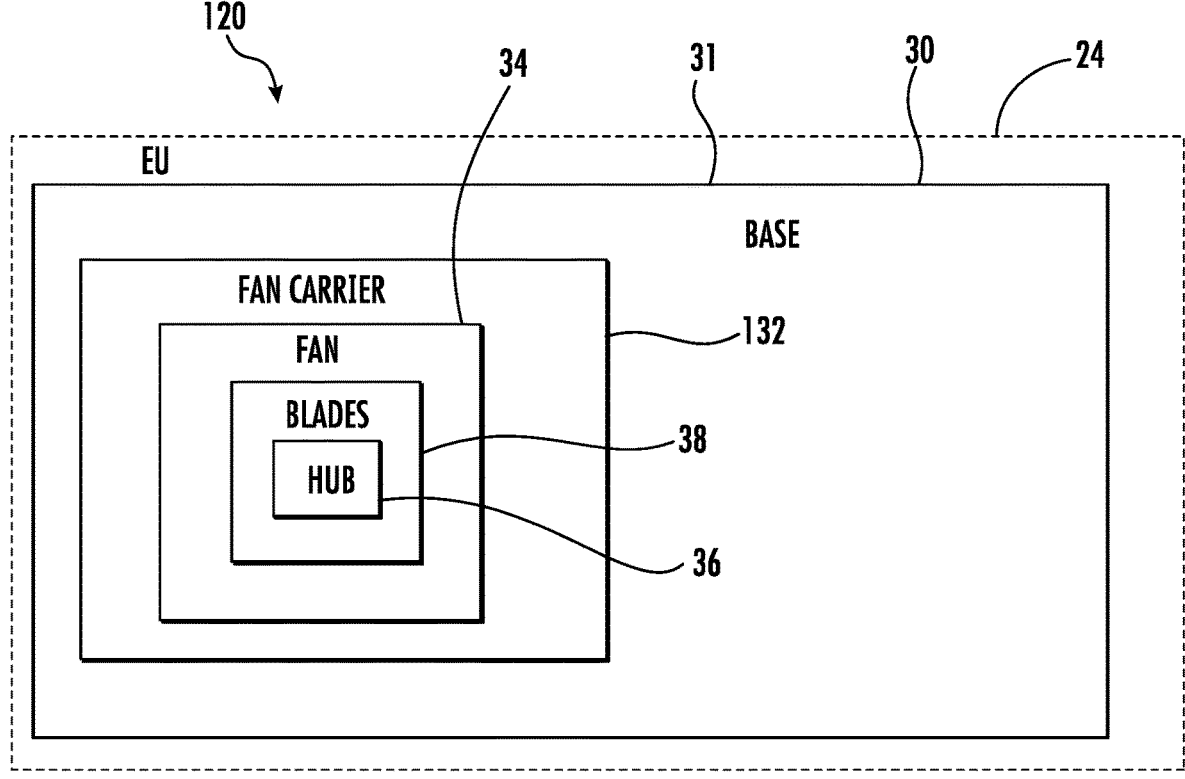
FIG. 4 is a block diagram schematically illustrating portions of the example EU stand of FIG. 3 with the fan in a second position.

FIGS. 3 and 4 are block diagrams schematically illustrating portions of an example EU stand 120. FIGS. 3 and 4 illustrate an example of how an EU stand may move a fan between different positions relative to a base of the stand and within a perimeter of the base to accommodate different orientations of an EU 24. EU stand 120 is similar to EU stand 20 except that EU stand 120 comprises fan carrier 132 in place of fan carrier 32. The remaining components of EU stand 120 which correspond to components of EU stand 20 are numbered similarly. EU stand 120 and EU 24, together, form an electronic system. For purposes of this disclosure, an "electronic system" refers to the combination of the electronics unit/device and its supporting stand.

Like fan carrier 32, fan carrier 132 is movably coupled to base 30 to move fan 34 between different positions relative to base 30. In the example illustrated, fan carrier 132 movably supports fan 34 to move the hub 36 of fan 34 between a first inset position (shown in FIG. 3) opposite to EU 24 in the vertical orientation and a second extended position (shown in FIG. 4) opposite to EU 24 in the horizontal orientation. In both the first inset position shown in FIG. 3 and the second extended position shown in FIG. 4, hub 36 of fan 34 lies within the perimeter of base 30. In the example illustrated, the second extended position of fan 34 shown in FIG. 4 provides enhanced airflow through and/or across the horizontal EU 24 as compared the first inset position for fan 34 shown in FIG. 3. Conversely, the first inset position of fan 34 shown in FIG. 3 provides enhanced airflow through and/or across the vertical EU 24 as compared to the second extended position for fan 34 shown in FIG. 4.

As with fan carrier 32, fan carrier 132 may be pivotally coupled to base 30 for movement between the first inset position and the second extended position. In some implementations, fan carrier 132 may pivot about a pivot axis parallel to the axis of hub 36 (the axis about which fan 34 is rotatably driven). In some implementations, fan carrier 132 may pivot about a pivot axis that is nonparallel to the axis of fan hub 36. For example, fan carrier 132 may flip between the first inset position and the second extended position. In some implementations, fan carrier 132 may translate or slide between the first inset position and the second extended position.

Figure 5:
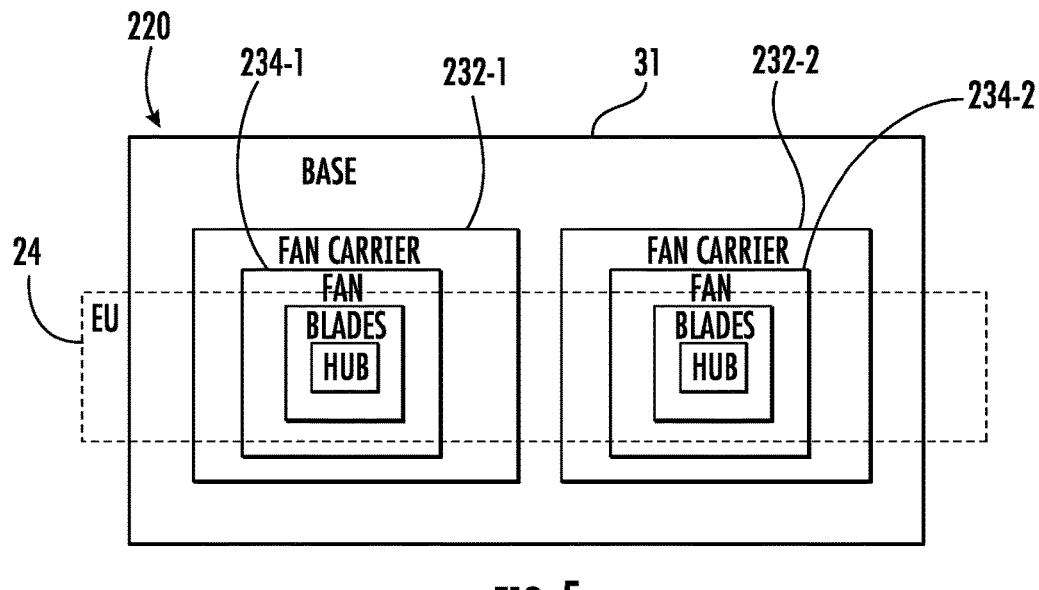
FIG. 5 is a block diagram schematically illustrated portions of an example EU stand with fans in first and second positions.
Figure 6:
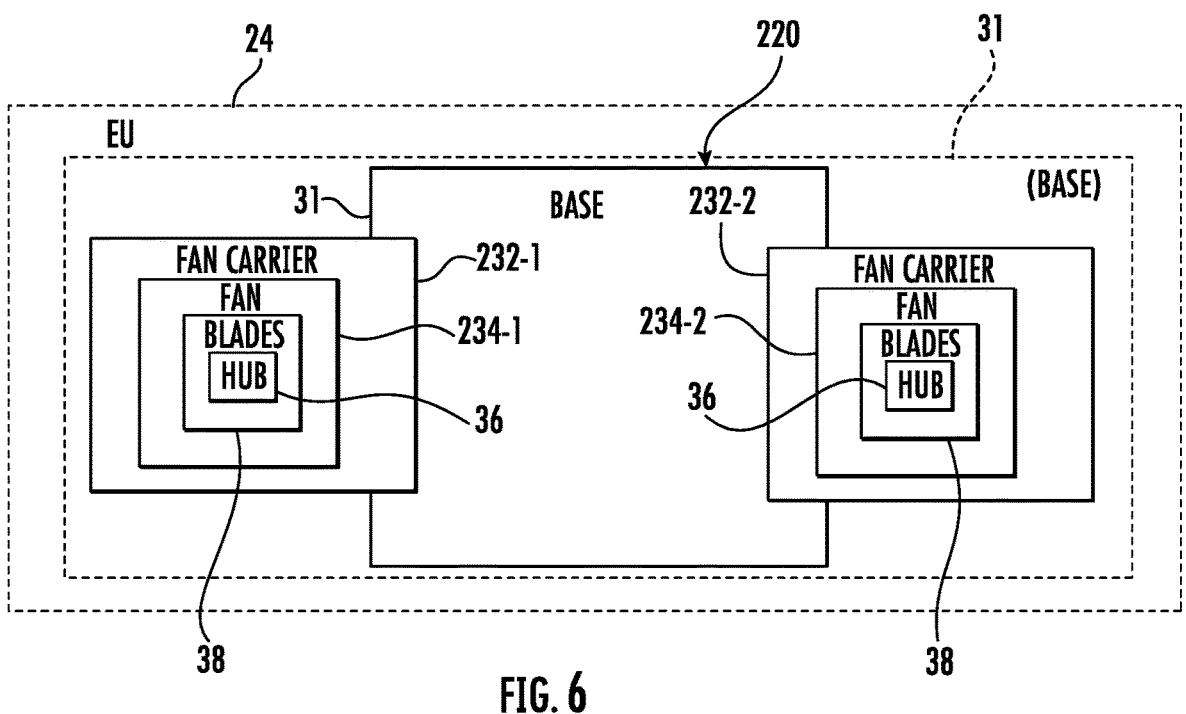
FIG. 6 is a block diagram schematically illustrate portions of the example EU stand of FIG. 5 with the fans in third and fourth positions.

FIGS. 5 and 6 illustrate an example of how multiple fans may be moved between inset positions that are within a perimeter of the stand base and extended positions that are outside the perimeter of the stand base to accommodate different orientations of an EU. FIG. 5 is a block diagram schematically illustrating an example EU stand 220 in a first state for supporting an example EU 24 (shown in broken lines) in a first vertical orientation. FIG. 6 is a block diagram schematically illustrating the example EU stand 220 in a second different state for supporting the example EU 24 (shown in broken lines) in a second horizontal orientation. EU stand 220 comprises base 30 (described above), fan carriers 232-1, 232-2 (collectively referred to as fan carriers 232, and fans 234-1, 234-2 (collectively referred to as fans 234).

Fan carriers 232 comprise structures that support fan 234-1 and 234-2, respectively. Each of fans 234 is similar to fan 34 described above. Each of fans 234 comprises a hub 36 which rotatably supports blades 38. Blades 38 extend from and about hub 36, wherein rotation of hub 36 and blades 38 drives air into and/or across EU 24 to dissipate heat from EU 24. Each of fans 234 may support a motor for rotatably driving the hub 36 and blades 38 about the axis of the hub 36.

As shown by FIGS. 5 and 6, fan carriers 232 are movably coupled to base 30 to move their respective fan hubs 36 between respective first and third inset positions (shown in FIG. 5) that are within a perimeter 31 of base 30 and a respective second and fourth extended positions (shown in FIG. 6) in which the fan hub 36 is beyond or outside the perimeter 31 of base 30. When fan carriers 232 are in their respective first and third inset positions shown in FIG. 5, the respective fan hubs 36 are spaced by a first distance. When fan carriers 232 are in their respective second and fourth extended positions shown in FIG. 6, the respective fan hubs 36 are spaced by a second distance greater than the first distance.

When in the first and third inset positions shown in FIG. 6, the two fans 234 may better align with EU 24 may provide enhanced airflow to EU 24 when EU 24 is in the vertical orientation. When in the second and fourth extended positions shown in FIG. 6, the two fans 234 may better align with EU 24 or may provide enhanced airflow to EU 24 when EU 24 is in the horizontal orientation. As shown by broken lines, in some implementations, fan carriers 232 may alternatively support the respective fans 234 for movement between different positions that both lie within the outer perimeter 31 of base 30.

In some implementations, fan carriers 232-1, 232-2 are each pivotably coupled to base 30 for movement between the first and third respective inset positions and the third and fourth respective extended positions. In some implementations, fan carriers 232-1, 232-2 may each pivot about a pivot axis parallel to the axis of hub 36 (the axis about which fan 234 is rotatably driven). In some implementations, fan carriers 232-1, 232-2 may pivot about pivot axes that are nonparallel to the axis of fan hubs 36. For example, fan carriers 232-1, 232-2 may each flip between the respective first and third inset positions and the respective second and fourth extended positions. In some implementations, fan carriers 232-1, 232-2 may each translate or slide in opposite directions between the respective first and third inset positions and the respective second and fourth extended positions. In some implementations, the fan carriers of a stand may concurrently pivot or translate between their inset and extended positions. In some implementations, the fan carriers of a stand may partially overlap one another in their inset positions. In some implementations, the fan carriers of a stand may alternately or sequentially pivot or translate, in turn, between their inset and extended positions.

Figures 7A, 7B, 7C, 7D:
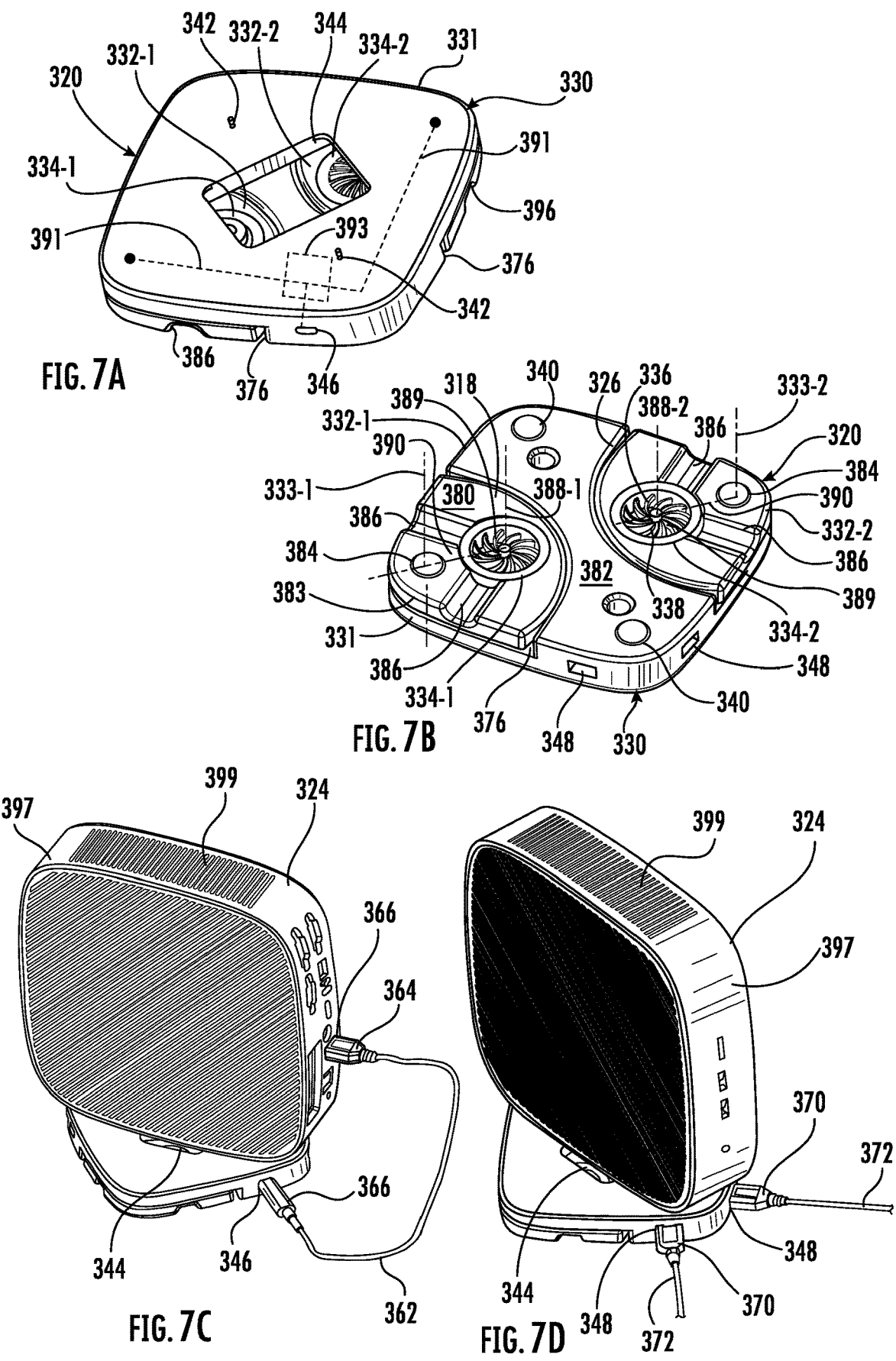
FIG. 7A is a top perspective view of an example EU stand with fans in first and second positions.
FIG. 7B is a bottom perspective view of the example EU stand of FIG. 7A with the fans in the first and second positions.
FIG. 7C is a first top perspective view of the example EU stand of FIG. 7A supporting an example EU in a vertical orientation
FIG. 7D is a second top perspective view of the example EU stand of FIG. 7A supporting the example EU in the vertical orientation.

FIGS. 7A-7F and FIGS. 8A-8E illustrate an example of how two fan carriers may pivot their respective fans relative to a base of a stand to accommodate different orientations of a supported EU. FIGS. 7A and 7B are top and bottom views, respectively, of an example EU stand 320 in a first state for supporting an example EU in a vertical orientation. FIGS.

Figure 7E:
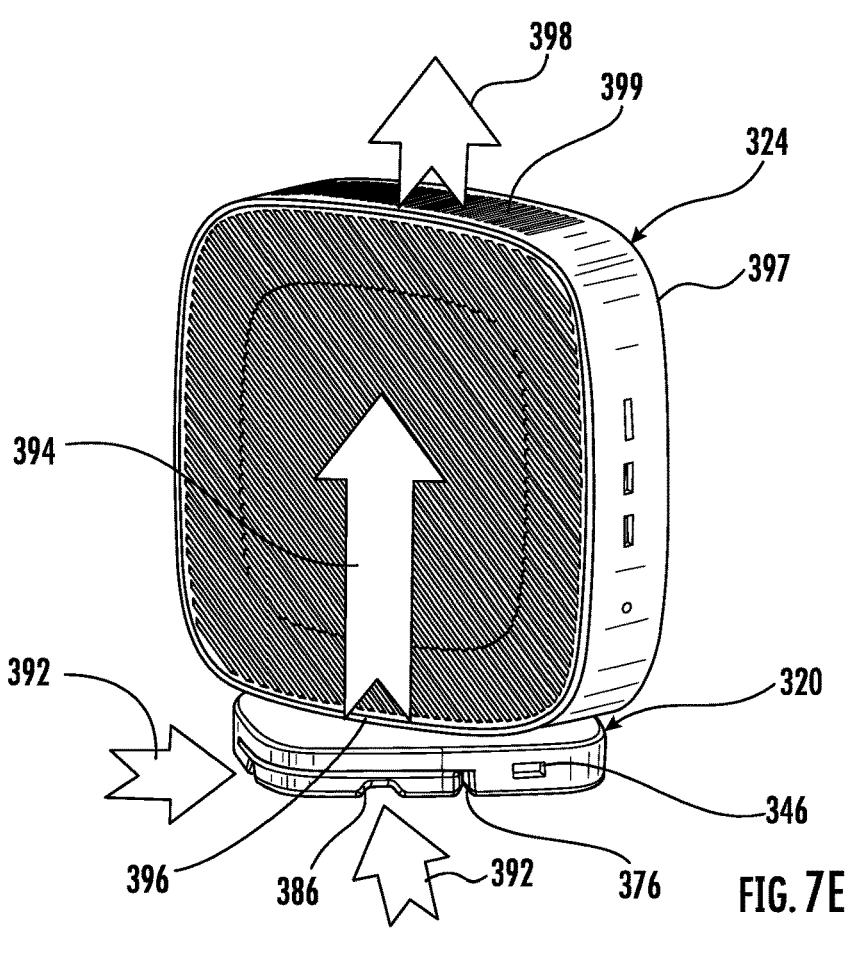
FIG. 7E is a top perspective view of the example EU stand of FIG. 7A supporting the example EU and illustrating airflow through the example EU in the vertical orientation.
Figure 7F:
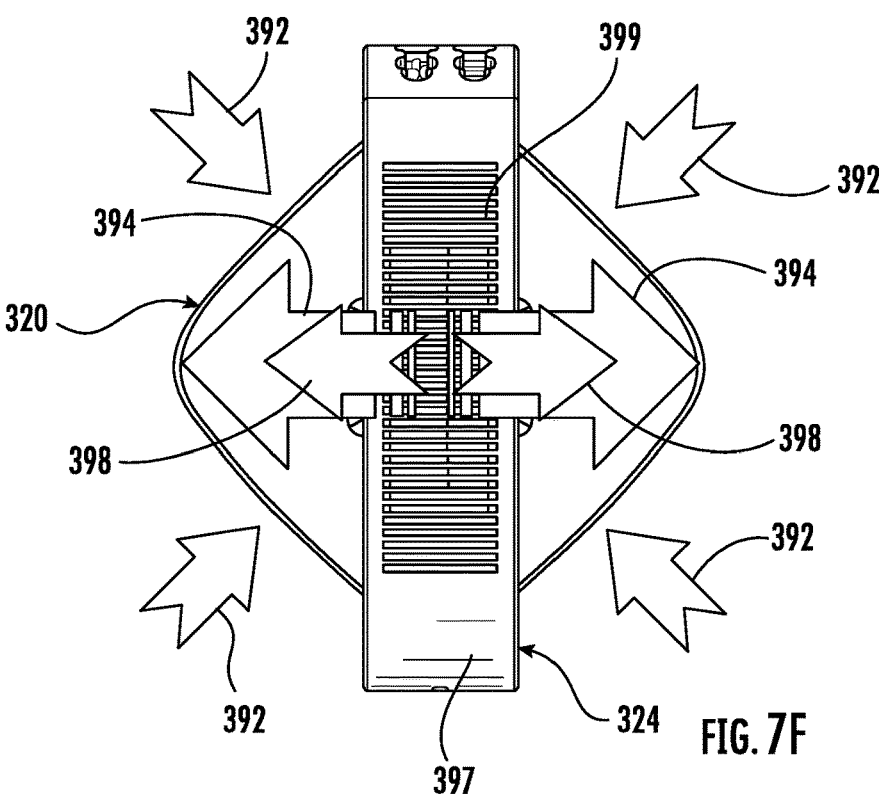
FIG. 7F is a top view of the example EU stand of FIG. 7A supporting the example EU and illustrating airflow through the example EU in the vertical orientation.

7C and 7D illustrate EU stand 320 supporting an example EU 324 in the vertical orientation. FIGS. 7E and 7F illustrate airflow generated by EU stand 320 and directed through the EU 324 while the EU stand is in the vertical orientation.

As shown by FIGS. 7A and 7B, EU stand 320 comprises base 330, fan carriers 332-1, 332-2 (collectively referred to as fan carriers 332) and fans 334-1, 334-2 (collectively referred to as fans 334). Base 330 comprises a structure that is to releasably mount to an overlying EU, such as the example EU 324 shown in FIGS. 7C-7F. Base 330 serves as a spacer for elevating and spacing the supported EU above an underlying support such as a floor, the floor of a cabinet, a desk top or the like. By spacing the EU 324 above the underlying support surface, airflow beneath the EU 324 is facilitated for enhanced cooling of the EU 324.

Base 330 comprises feet 340, EU mounting interfaces 342, airflow passage 344, EU power/communication port 346 and input-output ports 348. As shown by FIG. 7B, feet 340 extend from an underside of base 330. Feet 340 may be formed from a rubber, elastomeric polymer or other material to grip the underlying support surface. In some implementations, feet 340 may be formed from other non-rubber or non-elastomeric materials. In some implementations, feet 340 may be omitted.

As shown by FIG. 7A, mounting interfaces 342 extend on the top side of base 330. Mounting interfaces 342 facilitate releasable mounting or connection of base 330 to EU 324. In the example illustrated, mounting interfaces 342 comprises threaded fasteners for being threaded into corresponding threaded bores in EU 324. In other implementations, mounting interfaces 342 may have other forms. For example, in other implementations, mounting interfaces 342 may comprise threaded bores formed in the top surface of base 330. In some implementations, mounting interfaces 342 may comprise pins, snaps or other mechanism to releasably mount base 330 to an overlying EU 324. The exact form, location, size, shape and number of mounting interfaces 342 may vary depending upon the characteristics of EU 324.

Airflow passage 344 comprises a passage extending from those regions of base 330 adjacent to fans 334 to the top surface of base 330 which is adjacent to and directly underlies EU 324 when EU 324 is in the vertical orientation. Airflow passage 344 at least partially overlies each of fans 334 in the position shown in FIGS. 7A and 7B. Airflow passage 344 facilitates airflow generated by fans 334 to be directed underneath and into EU 324 when EU 324 is in the vertical orientation. Although illustrated as a single generally rectangular opening, airflow passage 344 may comprise multiple separate openings and/or may have other sizes and shapes depending upon the locations and sizes of fans 334 and the characteristics of the EU 324 being supported.

EU power/communication port 346 comprises an electrical port to facilitate electrical transmissions between base 330 and the supported EU 324. As shown by FIG. 7C, port 346 receives a corresponding cable plug 360 of a cable 362 having a plug 364 that connects to a corresponding port 366 of EU 324. In some implementations, port 346 facilitates the transmission of electrical power between base 330 and EU 324. For example, in some implementations, power may be supplied from EU 324 to base 330 via port 346 for powering fans 334. In some implementations, base 330 may receive power from an external source, wherein port 346 facilitates the transmission of power from base 330 to EU 324. In some implementations, port 346 may additionally or alternatively facilitate the transmission of data and/or control signals between base 330 and EU 324. In some implementations, port 346 may comprise a universal serial bus (USB) port or similar port.

Input-output ports 348 comprise electrical ports that facilitate the transmission of data and/or control signals to facilitate data communication to and from base 330. As shown by FIG. 7D, ports 348 receive corresponding cable plugs 370 of cables 372 to receive and transmit data and/or control signals. In some implementations, ports 348 receive control signals for controlling operation of fans 334. In some implementations, ports 348 serve as extra input-output ports for the supported EU 324. For example, in such implementations, EU 324 may transmit data signals through cable 362 to base 330 via port 346, wherein such data signals are further transmitted from base 330 through either or both of ports 348. In such implementations, base 330 may receive external data signals through port 348, wherein such data signals are further transmitted from base 330 through port 346 to EU 324. In some implementations, port 346 and/or ports 348 may be omitted.

Figure 8C:
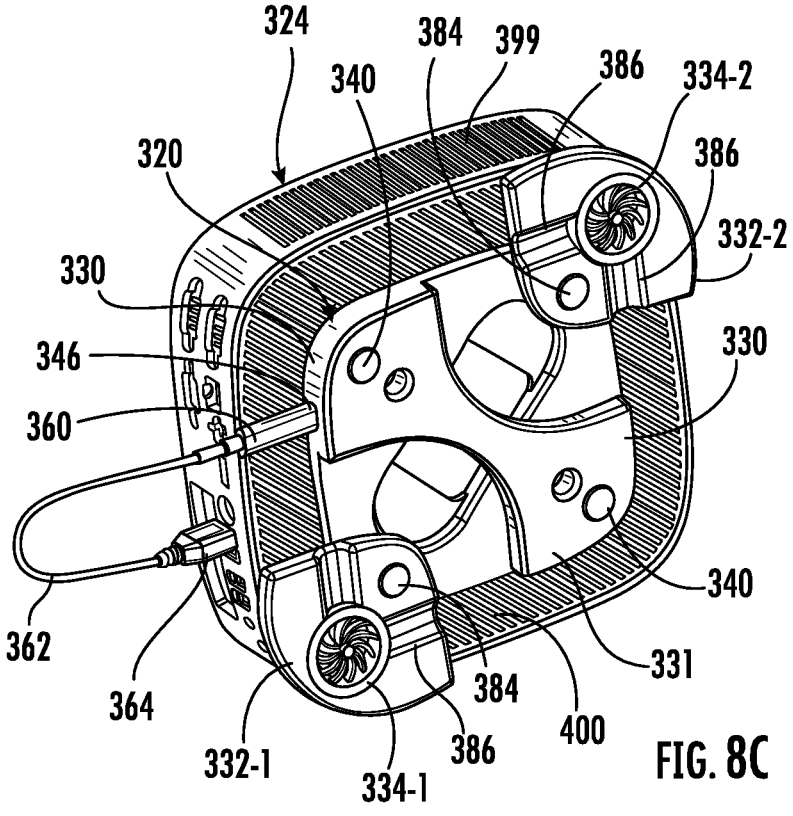
FIG. 8C is a first bottom perspective view of the example EU stand of FIG. 7A supporting the example EU in a horizontal orientation with the fans in the third and fourth positions.

Fan carriers 332 movably support fans 334 for movement between the positions shown in FIGS. 7A-7F and the positions shown in FIGS. 8A-8E. As shown by FIGS. 7B and 8B, fan carriers 332-1, 332-2 are located on an underside or bottom side of base 330 and are pivotably connected to base 330 for pivotal movement about axes 333-1, 333-2, respectively. In the positions shown in FIG. 7B, fans 334 are supported opposite to airflow passage 344 and opposite to the overlying EU 324. Fan carriers 332 are received within corresponding recesses 376 in the underside of base 330. In the example illustrated, each of fan carriers 332 has a generally flat plate or planar shape having a rounded edge 378 to facilitate receipt of the carriers 332 within recesses 376 and to facilitate rotation of carriers 332 out of recesses 376. In the example illustrated, when received within recesses 376, fan carriers 332 have a lower face 380 which is substantially flush with the lower face 382 of base 330. Likewise, fan carriers 332 have an outer perimeter or contour 383 which is substantially flush with and coincides with the outer perimeter 331 of base 330. As a result, in such positions, fan carriers 332 do not increase the overall footprint of base 330 and reduce the presence of any projections that may catch up on external objects.

In other implementations, fan carriers 332 may project beyond the outer perimeter 331 or beyond the lower face 382 of base 330. For example, each of fan carriers 332 may slightly project beyond perimeter 331 of base 330 to provide a handle or tab by which a person may grasp the respective fan carrier 332 to pivot respective fan carrier 332. In yet other implementations, fan carriers 332 may be recessed within recess 376, facilitating additional space for airflow below base 330.

In the example illustrated, fan carriers 332 each comprise feet 384 and airflow channels 386. Feet 384 comprise projections extending away from base 330 for engaging the underlying support surface. Feet 384 cooperate with feet 340 of base 330 to support stand 320. In some implementations, feet 384 are formed from rubber or elastomeric polymers to facilitate gripping of the underlying support surface. In other implementations, feet 384 may be formed from materials other than rubber or elastomeric polymers.

Airflow channels 386 comprise channels or grooves formed in the underside of fan carriers 332. Airflow channels 386 extend from their respective fans 334 through the outer contours 383 of fan carriers 332. In the example illustrated, each of fan carriers 332 comprises a pair of channels 386: a first channel extending to a first side of base 330 and a second channel extending to a second different side of base 330. In other implementations, fan carrier 332 may have a single channel 386 or greater than two channels 386 for supplying air to fans 334.

Fans 334 direct airflow upwards through EU 324. In the position shown in FIG. 7B, fans 334 direct air flow through airflow passage 344 through a vertically oriented EU 324. Each of fans 334 comprises hub 336 and blades that extend from hub 336 and that are twisted or shaped so as to direct air in an upward direction through base 330 or towards an overlying EU 324 when rotatably driven. Hubs 336 of fans 334-1, 334-2 are rotatably driven about a corresponding fan rotation axes 388-1, 388-2, respectively.

As further shown by FIGS. 7A and 7B, fans 334 additionally comprise electrically powered motors 389 rotatably driving hubs 336. Such motors 389 receive electrical power via electrical power transmitting traces or wires 390 (schematically represented by dashed lines) contained within fan carriers 332. In some implementations, fan carriers 332 comprise chambers for receiving batteries for powering such fans. In other implementations, fan carriers 332 have internal electrically conductive wires 390 which are electrically connected to corresponding wires 391 (schematically represented by dashed lines) in base 330 by electrical contact pads on opposing adjacent surfaces of recesses 376 and fan carriers 332 or via electrical slip rings, wherein the electrical slip rings may comprise an electrical conductive brush that rubs against a rotating electrical conductive ring to transmit electrical power between the stationary base 330 and the rotating fan carrier 332. In other implementations, electrical power may be transmitted across the rotary joints between base 330 and fan carriers 332 using other rotary electrical interfaces or electrical rotary joints. In some implementations, the wires 391 in base 330 transmit power received via port 346 or received from a battery contained within base 330. As schematically shown by broken lines, in some implementations, base 330 may additionally comprise an integrated circuit board or other form of a controller 393 (having a processor and a non-transitory computer-readable medium) for controlling the power supply to fans 334 to control or adjust the speed at which fans 334 operate.

As shown by FIGS. 7E and 7F, rotation of fans 334 moves air to create airflow through base 330 and through the overlying vertically oriented EU 324. As indicated by arrows 392, air is drawn through airflow channels 386 to fans 334. The fresh or ambient air being drawn into airflow channel 386 is at a lower temperature than the temperature of the electronic components contained within EU 324. As indicated by arrow 394, fans 334 further direct the received air upwards through airflow passage 344, through lower perimeter side vents 396 formed in the outer housing 397 of EU 324. As the cooler air flows through EU 324, the cooler air absorbs heat from the internal electronic components of EU 324. As indicated by arrow 398, the hotter air, following absorption of heat from EU 324, is further directed through upper perimeter side vents 399 of EU 324, discharging heat from EU 324.

FIGS. 8A-8E illustrate stand 320 in a second state adapted for supporting and cooling EU 324 in a horizontal orientation. FIGS. 8A and 8B illustrate stand 320 with fan carriers 332 pivoted about axes 333 to the extended positions shown in which hubs 336 of fans 334 are each located outside the perimeter 331 of base 330. In the example illustrated, each of fan carriers 332 is rotatable 360° about its respective axis 333. In some implementations, each of fan carriers 332 may alternatively be rotatable in one direction and less than 360°, such as 180° to the extended position shown.

Figure 8D:
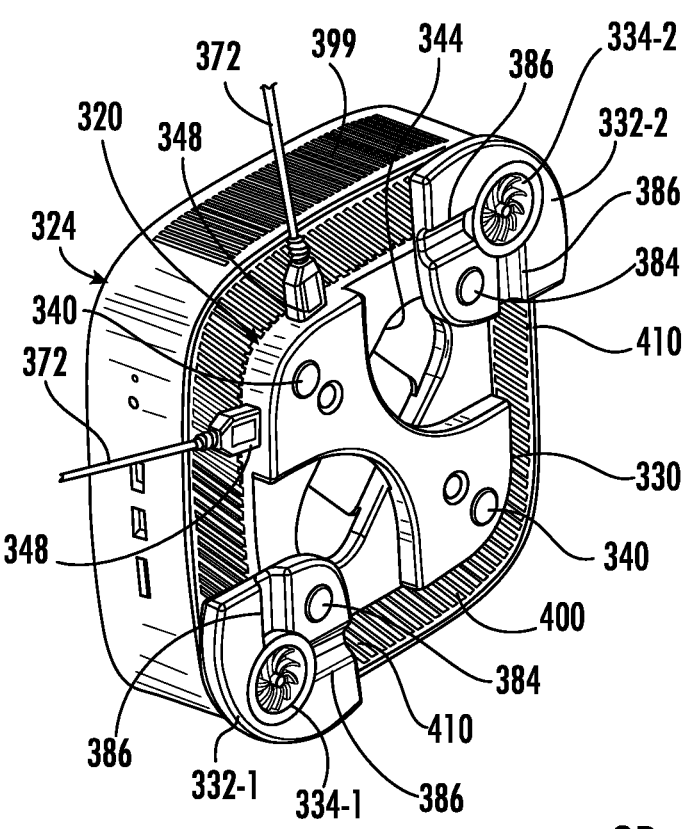
FIG. 8D is a second bottom perspective view of the example EU stand of FIG. 7A supporting the example EU in the horizontal orientation with the fans in the third and fourth positions.

As shown by FIGS. 8C and 8D, when fan carriers 332 are in the second extended positions in which hubs 336 lie outside the perimeter 331 of base 330, fans 334 lie directly opposite to a bottom face 400 of EU 324, outside of perimeter 331 of base 330. In the extended positions, fans 334 do not project beyond the outer perimeter of EU 324. As a result, airflow is directed through the opposite major dimensions or faces of EU 324.

Figures 8E, 9A, 9B:
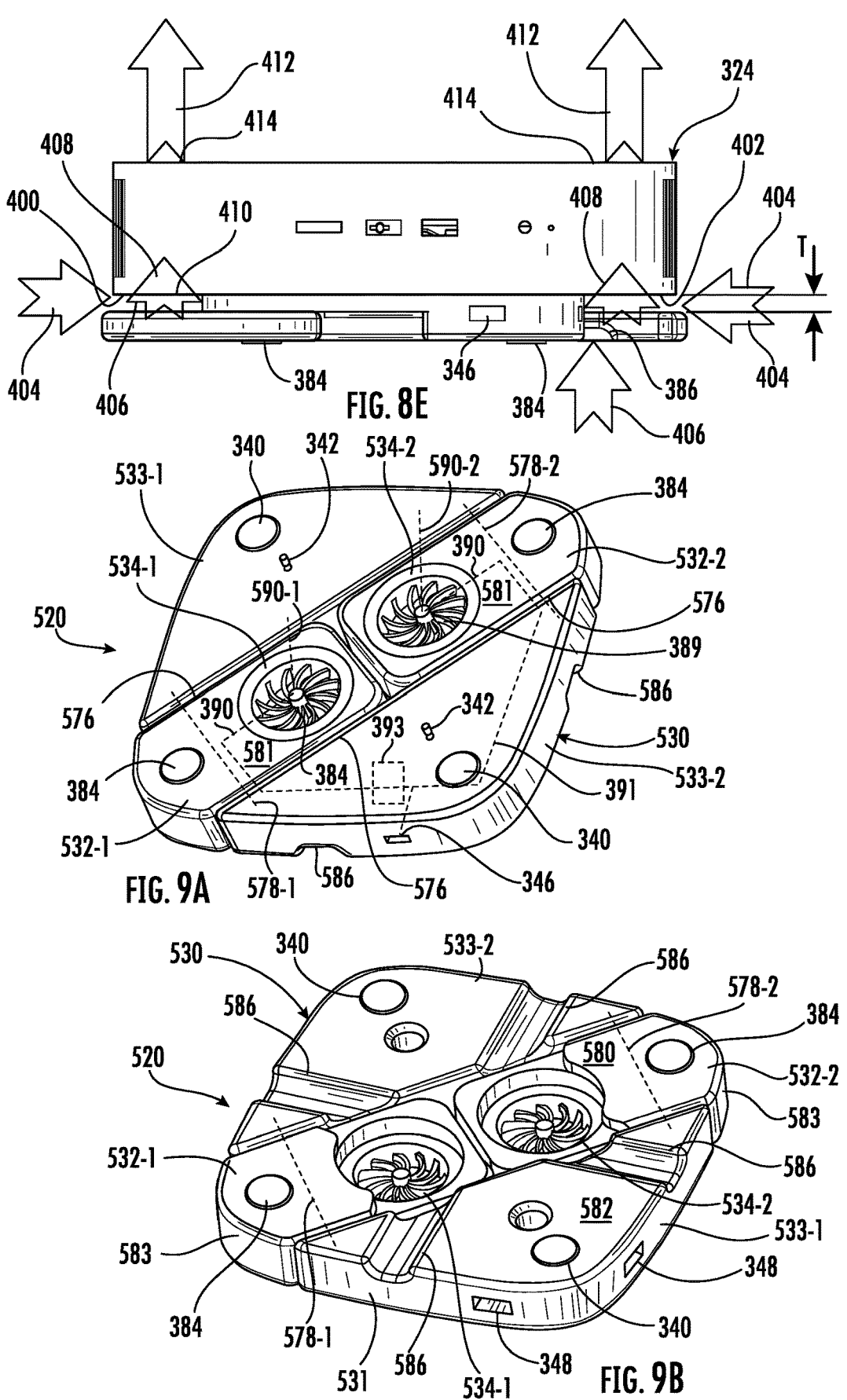
FIG. 8E is a side view of the example EU stand of FIG. 7A supporting the example EU with the fans in the third and fourth positions and illustrating airflow through the example EU in the horizontal orientation.
FIG. 9A is a top perspective view of an example EU stand with fans in first and second positions.
FIG. 9B is a bottom perspective view of the example EU stand of FIG. 9A with the fans in the first and second positions.

FIG. 8E illustrates airflow generated by fans 334 through EU 324 in a horizontal orientation. As shown by FIG. 8E, fan carriers 332 are spaced from the bottom face 400 of EU 324 by a gap 402. As indicated by arrows 404, fans 334 draw air through gap 402. In some implementations, gap 402 has a thickness T of 5 mm or more. As indicated by arrow 406, fans 334 further draw air through airflow channels 386. As indicated by arrows 408, fans 334 further direct airflow through vent openings 410 in face 400 and through EU 324. As a cooler ambient or fresh air flows through and across EU 324, the air absorbs heat being discharged from the heat generating electronic components of EU 324. As indicated by arrows 412, the heated or warmer air is discharged through vent openings 414 in the upper face of EU 324, cooling EU 324.

Figures 9C, 9D:
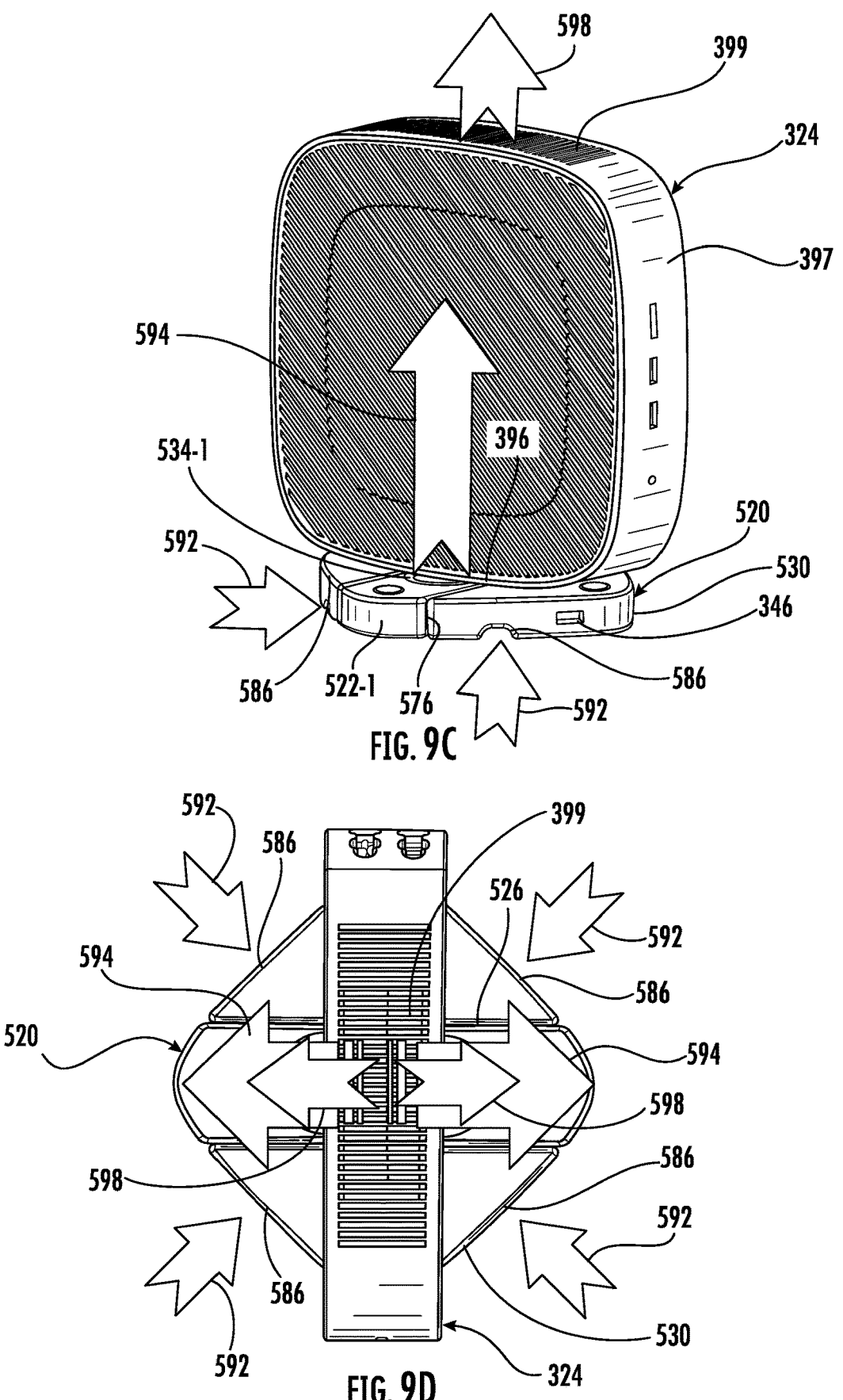
FIG. 9C is a top perspective view of the example EU stand of FIG. 9A supporting the example EU with the fans in the first and second positions and illustrating airflow through the example EU in the vertical orientation.
FIG. 9D is a top view of the example EU stand of FIG. 9A supporting the example EU with the fans in the first and second positions and illustrating airflow through the example EU in the vertical orientation.

FIGS. 9A-9D and 10A-10D illustrate an example of how two fan carriers may pivot and flip their respective fans relative to a base of a stand to accommodate different orientations of a supported EU. FIGS. 9A and 9B are top and bottom views, respectively, of an example EU stand 520 in a first state for supporting an example EU in a vertical orientation. FIGS. 9C and 9D illustrate airflow generated by EU stand 520 and directed through the EU 324 while the EU stand 320 is in the vertical orientation.

As shown by FIGS. 9A and 9B, EU stand 520 comprises base 530, fan carriers 532-1, 532-2 (collectively referred to as fan carriers 532) and fans 534-1, 534-2 (collectively referred to as fans 534). Base 530 comprises a structure that is to releasably mount to an overlying EU, such as the example EU 324 shown in FIGS. 9C-9D. Base 530 serves as a spacer for elevating and spacing the supported EU above an underlying support such as a floor, the floor of a cabinet, a desk top or the like. By spacing the EU 324 above the underlying support surface, airflow beneath the EU 324 is facilitated for enhanced cooling of the EU 324.

Base 530 is similar to base 330 described above except that base 530 comprises two halves 533-1, 533-2 which are spaced by an intervening opening 576 and which are joined by the hinges 578-1, 578-2 (schematically shown and collectively referred to as hinges 578). Hinges 578 extend through fan carriers 532 across opening 576. Opening 576 serves as a recess for receiving fan carriers 532-1 and 532-2. Hinges 578 pivotably support fan carriers 532 for pivotal movement about axes that are coincident with hinges 578 (schematically illustrated with dashed lines), that extend generally perpendicular to the rotational axes 590-1, 590-2 of fans 534 and that extend parallel to or within a plane generally containing base 530. Hinges 578 facilitate positioning of fans 534 at centralized locations within the perimeter of base 530 such that fans 534 extend opposite to and underlie EU 324 when EU 324 is in a vertical orientation as shown in FIGS. 9C and 9D.

As shown by FIG. 9B, in the example illustrated, each of halves 533 additionally comprises airflow channels 586. Airflow channels 586 are similar to airflow channels 386 except that airflow channels 586 extend through halves 533. Airflow channels 586 extend from a perimeter of base 530 to regions of opening 576 adjacent to fans 534 when fans 534 are in the positions shown in FIGS. 9A and 9B. Similar to airflow channels 386, airflow channels 586 facilitate the drawing of air beneath base 530 by fans 534 for further direction through the overlying EU 324. In other implementations, each of halves 533 may have a single channel 886 or greater than two channels 586 for supplying air to fans 334. In some implementations, channels 586 may have other non-linear shapes. In some implementations, channels 586 may be omitted.

Fan carriers 532-1, 532-2 are similar to fan carriers 332 in that fan carriers 532 movably support fans 534-1 and 534-2, respectively, relative to base 530. Like fan carriers 332, fan carriers 532 comprise feet 384 (described above). Unlike fan carriers 32, fan carriers 532 include feet 384 on both bottom face 580 of fan carriers 532 and top face 581 of fan carriers 532. As a result, when fan carriers 532 are flipped about the axes of hinges 578 (as shown in FIGS. 10A-10D), the feet 384 on faces 581 face downward to cooperate with feet 340 to support stand 520 on the underlying support surface.

Like fan carriers 332, fan carriers 532 have an outer perimeter 583 which extends substantially flush with the outer perimeter 531 of base 530 when in the inset positions shown in FIGS. 9A and 9B. As a result, fan carriers 532 do not increase the overall footprint of base 530 when base 530 is supporting EU 324 in a vertical orientation. Like fan carriers 332, fan carriers 532 further have a lower face 580 which flush with the lower face 582 of base 530 when fan carriers 532 are in the inset positions.

Fans 534 are each similar to fans 334 described above. As shown by FIGS. 9A and 9B, fans 534 additionally comprise electrically powered motors 389 rotatably driving hubs 336. Such motors 389 receive electrical power via electrical power transmitting traces or wires 390 contained within fan carriers 532. In some implementations, fan carriers 532 comprise chambers for receiving batteries for powering such fans. In other implementations, fan carriers 532 have internal electrically conductive wires 390 which are electrically connected to corresponding wires 391 via electrical slip rings, wherein such electrical slip rings comprise an electrical conductive brush that rubs against a rotating electrical conductive ring to transmit electrical power between the stationary base 530 and the rotating fan carrier 532. In other implementations, electrical power may be transmitted across the rotary joints between base 530 and fan carriers 532 using other rotary electrical interfaces or electrical rotary joints. In some implementations, the wires 391 in base 530 transmit power received via port 346, received from a battery contained within base 330 or received from an alternative connection to an external power source, such as through port 346. As schematically shown by broken lines, in some implementations, base 530 may additionally comprise an integrated circuit board or other form of a controller 393 (having a processor and a non-transitory computer-readable medium) for controlling the power supply to fans 534 to control or adjust the speed at which fans 534 operate.

As shown by FIGS. 9C and 9D, rotation of fans 534 moves air to create airflow through base 530 and through the overlying vertically oriented EU 324. As indicated by arrows 592, air is drawn through airflow channels 586 to fans 534. The fresh or ambient air being drawn into airflow channels 586 is at a lower temperature than the temperature of the electronic components contained within EU 324. As indicated by arrow 594, fans 534 further direct the received air upwards through lower perimeter side vents 396 formed in the outer housing 397 of EU 324. As the cooler air flows through EU 324, the cooler air absorbs heat from the internal electronic components of EU 324. As indicated by arrow 598, the hotter air, following absorption of heat from EU

324, is further directed through upper perimeter side vents 399 of EU 324, discharging heat from EU 324. Although mount interfaces 342 are illustrated as removably mounting EU 324 in a vertical orientation perpendicular to opening 576 (parallel to the axes of hinges 578), in other implementations where EU 324 is wider so as to overlap portions of halves 533, mount interfaces 342 may be relocated to mount EU 324 in a vertical orientation that is parallel to opening 576, perpendicular to axes of hinges 578 to provide enhanced alignment of EU 324 with fans 534.

Figure 10A:
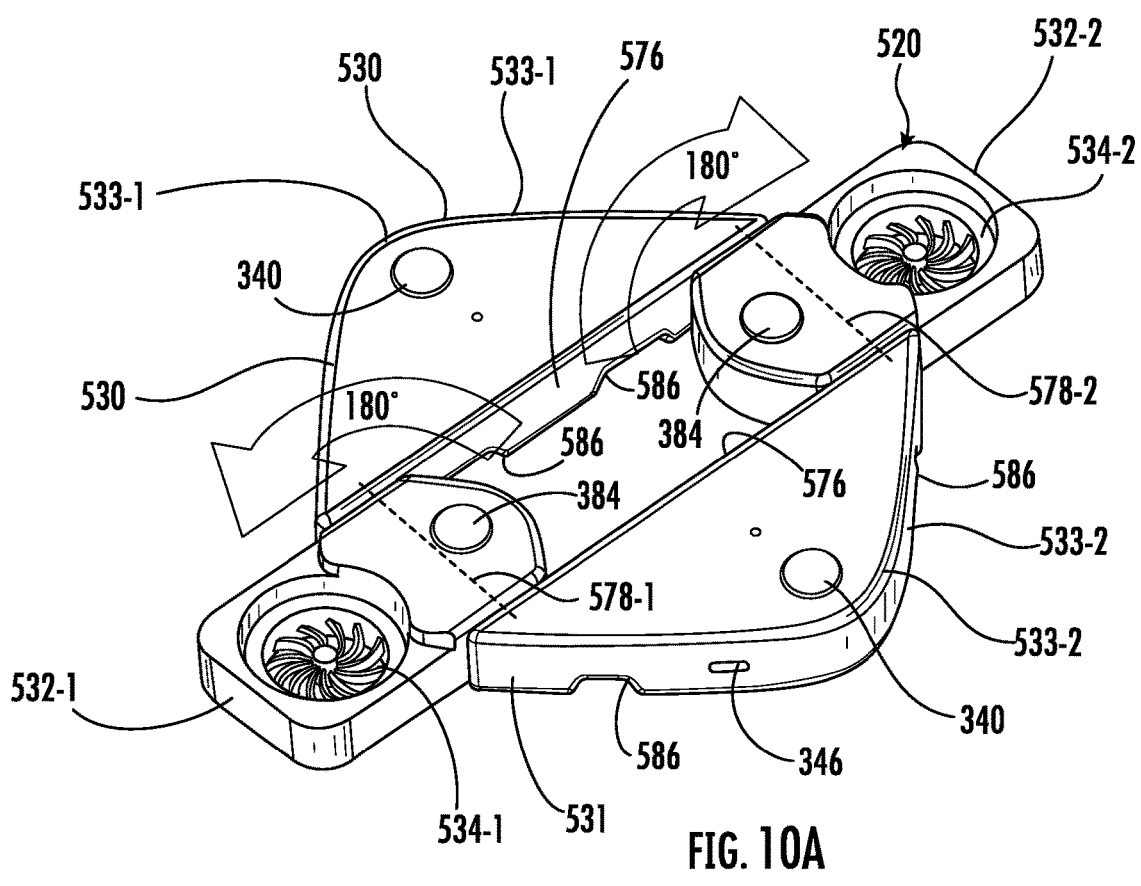
FIG. 10A is a top perspective view of the example EU stand of FIG. 9A with the fans in third and fourth positions.
Figure 10B:
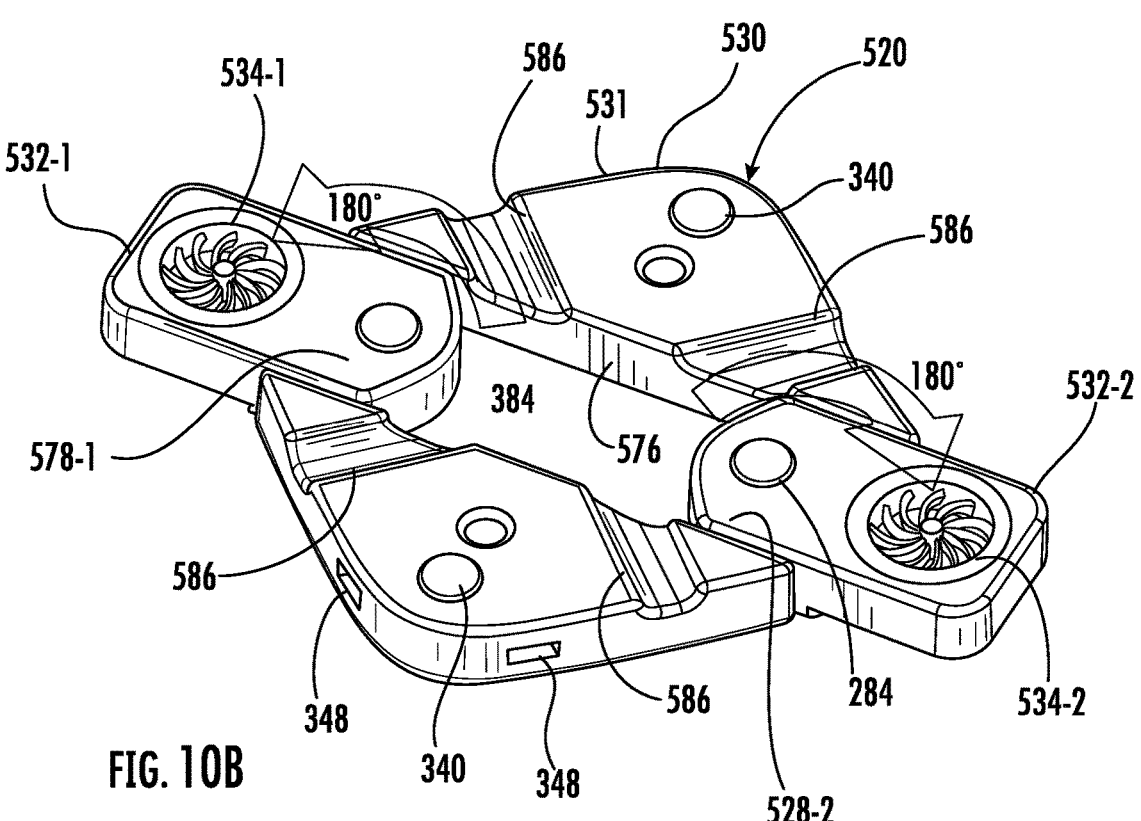
FIG. 10B is a bottom perspective view of the example EU stand of FIG. 9A with the fans in the third and fourth positions.

FIGS. 10A-10D illustrate stand 520 in a second state adapted for supporting and cooling EU 324 in a horizontal orientation. FIGS. 10A and 10B illustrate stand 320 with fan carriers 532 pivoted about the axes of hinges 578 to the extended positions shown in which hubs 336 of fans 534 are each located outside the perimeter 531 of base 530. In the example illustrated, each of fan carriers 532 is rotatable 180° or more about the axis of its respective hinge 578.

Figures 10C, 10D:
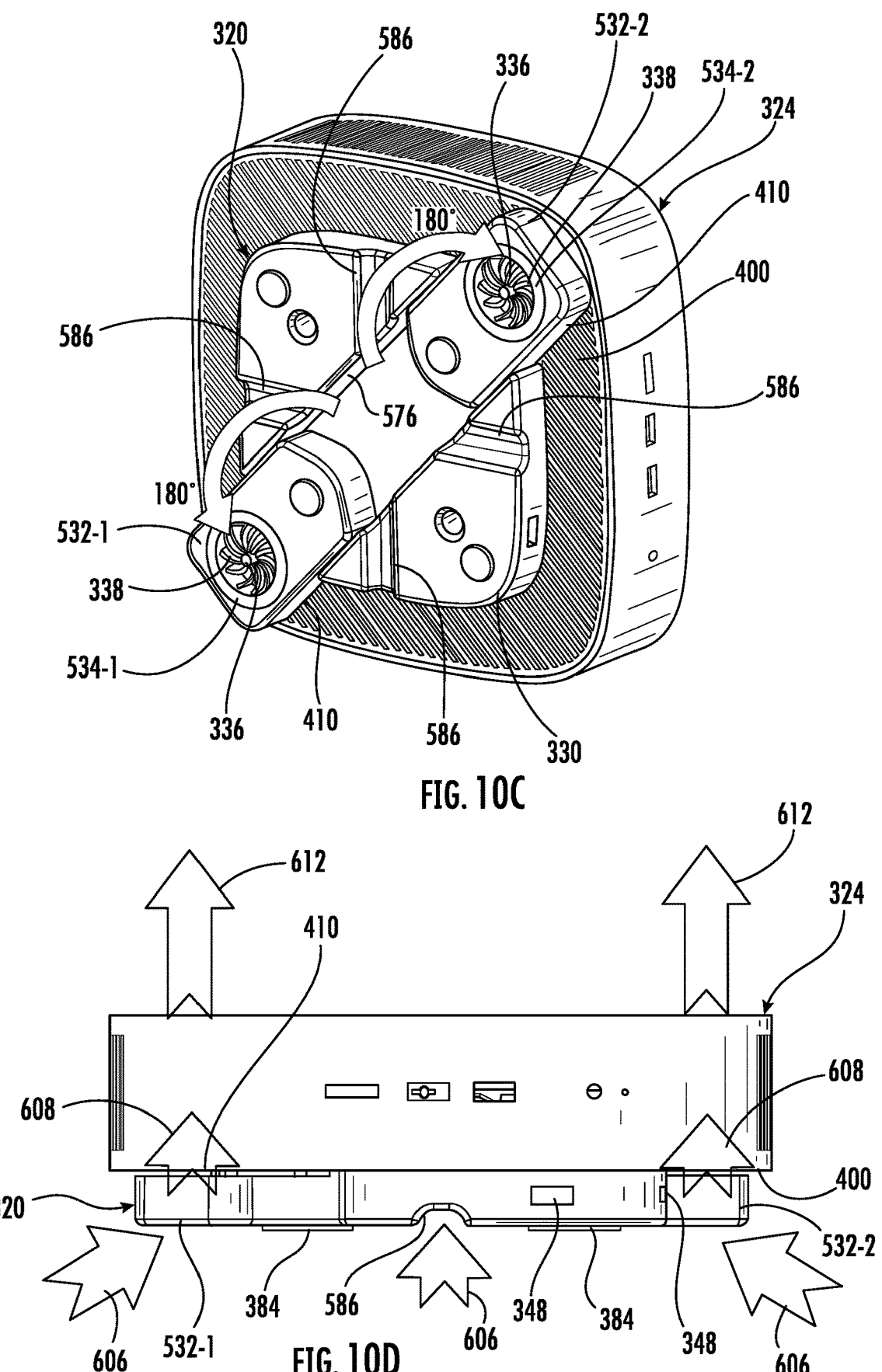
FIG. 10C is a bottom perspective view of the example EU stand of FIG. 9A supporting the example EU in the horizontal orientation with the fans in third and fourth positions.
FIG. 10D is a side view of the example EU stand of FIG. 9A supporting the example EU with the fans in the third and fourth positions and illustrating airflow through the example EU in the horizontal orientation.

As shown by FIGS. 10C and 10D, when fan carriers 532 are in the second extended positions in which hubs 336 lie outside the perimeter 531 of base 530, fans 534 lie directly opposite to a bottom face 400 of EU 324, outside of perimeter 531 of base 530. In the extended positions, fans 534 do not project beyond the outer perimeter of EU 324. As a result, airflow is directed through the opposite major dimensions or faces of EU 324.

FIGS. 10C and 10D illustrate stand 520 mounted to EU 324 in a horizontal orientation to form an electronic system. FIG. 10D illustrates airflow generated by fans 534 through EU 324 in a horizontal orientation. As indicated by arrow 606, fans 534 draw air through airflow channels 586. As indicated by arrows 608, fans 534 further direct airflow through vent openings 410 in face 400 and through EU 324. As a cooler ambient are fresh air flows through and across EU 324, the air absorbs heat being discharged from the heat generating electronic components of EU 324. As indicated by arrows 612 the heated or warmer air is discharged through vent openings 414 in the upper face of EU 324, cooling EU 324.

Figures 11A, 11B, 12:
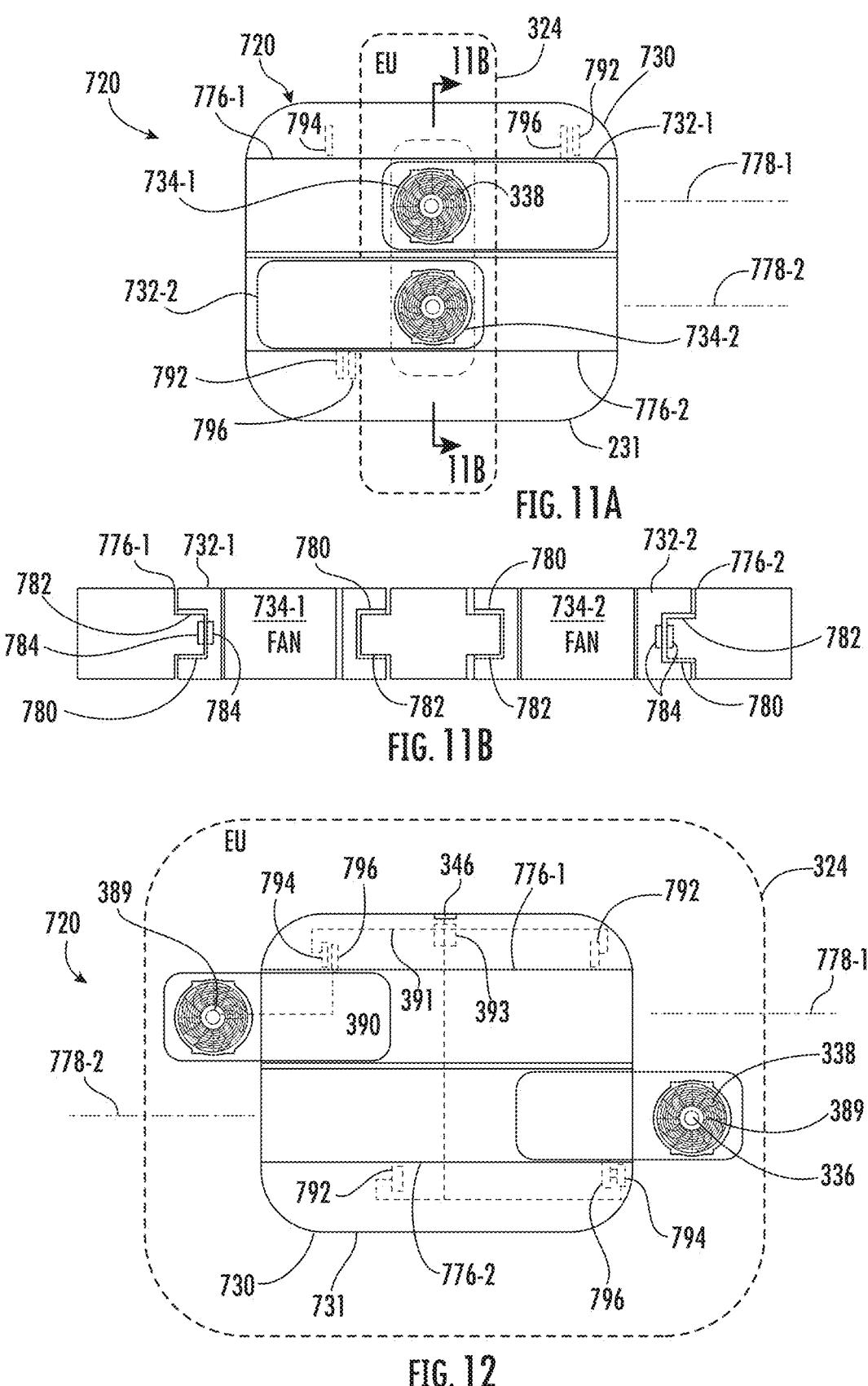
FIG. 11A is a bottom view of portions of an example EU stand with fans in first and second positions and supporting an example EU in a vertical orientation.
FIG. 11B is a sectional view of the example EU stand of FIG. 11A taken along line 11B-11B.
FIG. 12 is a bottom view of portions of the example EU stand of FIG. 11A with the fans in third and fourth positions and supporting the example EU in a horizontal orientation.

FIGS. 11A-11B and 12 illustrate an example of how two fan carriers may slide or otherwise translate their respective fans relative to a base of a stand to accommodate different orientations of a supported EU. FIGS. 11A and 11B illustrate an example EU stand 720 supporting EU 324 in a vertical orientation. FIG. 12 illustrates the example EU stand 720 supporting EU 324 in a horizontal orientation.

As shown by FIGS. 11A and 11B, EU stand 720 comprises base 730, fan carriers 732-1, 732-2 (collectively referred to as fan carriers 732) and fans 734-1, 734-2 (collectively referred to as fans 734). Base 730 is similar to base 330 described above except that base 730 comprises slots 776-1 and 776-2 in which fan carriers 732 translate or slide between the inset positions shown in FIG. 11A and the extended positions shown in FIG. 12. In the example illustrated, base 730 additionally comprises feet 340 and ports 346, 348 (described above and shown in FIGS. 7A and 7B).

Fan carriers 732 are similar to fan carriers 332 and 532 described above in that fan carriers 732 movably support fans 734 while providing electrical power connections to fans 734. Fan carriers 732 are slidably supported by base 730 to translate along axes 778-1 and 778-2, respectively. FIG. 11B is a sectional view taken along line 11B-11B of FIG. 11A. FIG. 11B illustrates one example of how fan carriers 732 may be slidably supported for translation within slots 776. In the example illustrated, each of fan carriers 732 comprises a pair of grooves 780 facing in opposite directions. Grooves 780 slidably receive corresponding projections or tongues 782 extending along the interior side of slots 776 from base 730.

Fans 734 are similar to fans 334 and fans 734 described above. Fan 734 each comprise a hub 336 from which and about which blades 338 extend. Hub 336 is rotatably driven by a motor 389. The motor 389 may be powered in a variety of fashions. In some implementations, each of fan carriers 732 comprises a battery compartment for receiving a battery or multiple batteries which are electrically connected to the motor 389 to power the motor 389. In some implementations, each of fan carrier 732 may comprise an internal electrically conductive trace or wire 390 which electrically connects to a corresponding electrically conductive trace or wire 391 in base 730 which supplies power from a battery or batteries located within base 730 or from an external power source through port 346. In some implementations, electrical power may be transmitted from base 730 to each of the fan carriers 732 across electrically conductive contact pads 784 (shown in FIG. 11B) which contact and slide relative to one another along grooves 780.

In some implementations, as shown by FIG. 12, electrical power is transmitted from base 730 to each of the fan carrier 732 across mating pin and socket, wherein the sockets receive the pins when fan carrier 732 are in either of the inset position shown in FIG. 11A or the extended position shown in FIG. 12. For example, as shown in broken lines, for each of fan carriers 732, base 730 may comprise a first electrical connection socket 792 and a second electrical connection socket 794. Each fan carrier 732 may comprise a dual sided plug or projection 796 having pins. Sliding fan carriers 732 to the inset position shown in FIG. 11A results in the electrically conductive pins of projection 796 being received within the first electrical connection sockets 792. Sliding fan carriers 732 to the extended position shown in FIG. 12 results in the electrically conductive pins of projection 796 being received within the second electrical connection socket 794. In addition to providing electrical power for fans 734 in either of the two positions, the mating interaction of the sockets and pins provides stops which tactilely indicate completion of movement of fan carriers 732 to either of the inset or extended positions. In other implementations, electrical power may be provided from base 730 to fan 734 by the other electrical connection arrangements. As described above, in some implementations, base 730 and/or fan carrier 732 may additionally comprise a controller 393 (comprising a processor and a non-transitory computer-readable medium) for the controlling or adjusting the speed of fans 734.

When fan carriers 732 are in the first inset positions shown in FIG. 11A, fans 734 and their hubs 336 are centrally located within the perimeter 731 of base 730. In the example illustrated, hub 336 are aligned with one another along an axis extending perpendicular to perimeter 731. As a result, fans 734 may be provided with enhanced alignment with the EU 324 which is in the vertical orientation. Operation of fans 734 results in airflow being directed upwards through the vertically oriented EU 324.

When fan carriers 732 are in the second extended position shown in FIG. 12, hubs 336 of fan 734 lie outside the perimeter 731 of base 730. Hubs 731 are spaced from one another by a greater distance in the second extended position shown in FIG. 12 as compared to the first inset position shown in FIG. 11A. In the second extended position shown in FIG. 12, fans 734 may direct airflow upwards through a larger portion of EU 324 in the horizontal orientation.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An electronics unit (EU) stand comprising:
a base to couple to an electronics unit having heat generating components, the base having a perimeter; and
a fan carrier supporting a fan having blades extending about a fan hub, the fan carrier being movably coupled to the base to move the fan hub between a first position within a perimeter of the base and a second position beyond the perimeter of the base,
wherein the fan carrier or the base comprises a groove formed therein that acts as an airflow passage for airflow moved by the fan.

2. The EU stand of claim 1, wherein the fan carrier is slidably coupled to the base for movement between the first position and the second position.

3. The EU stand of claim 1, wherein the fan carrier is pivotably coupled to the base for movement between the first position and the second position.

4. The EU stand of claim 3, wherein the fan carrier is pivotably coupled to the base for pivotal movement about a pivot axis parallel to the fan hub.

5. The EU stand of claim 3, wherein the fan carrier is pivotably coupled to the base for pivotal movement about a pivot axis nonparallel to the fan hub.

6. The EU stand of claim 1 further comprising an input-output port in the base to provide additional data communication for the electronics unit.

7. The EU stand of claim 1, wherein the base has a base perimeter wherein the fan carrier has a carrier perimeter and wherein the fan carrier perimeter is flush with the base perimeter when the fan carrier is in the first position.

8. The EU stand of claim 1, wherein the groove is formed in the fan carrier and extends from a perimeter of the fan carrier towards the fan hub.

9. The EU stand of claim 1, wherein the groove is formed in the base and extends from the perimeter of the base towards the fan hub when the fan hub is in the first position.

10. The EU stand of claim 1 further comprising a second fan carrier having second blades extending about a second fan hub, the second fan carrier being movably coupled to the base to move the second fan hub between a third position within the perimeter of the base and a fourth position outside the perimeter of the base.

11. The EU stand of claim 10, wherein the fan carrier and the second fan carrier are each slidable relative to the base.

12. The EU stand of claim 10, wherein the fan carrier and the second fan carrier are pivotable about parallel axes spaced from the fan hub and the second fan hub.

13. The EU stand of claim 10, wherein the fan hub and the second fan hub are spaced by a first distance when the fan carrier and the second fan carrier are in the first position and the third position, respectively, and wherein the fan hub and the second fan hub are spaced by a second distance, greater than the first distance, when the fan carrier and the second fan carrier are in the second position and the fourth position, respectively.

14. The EU stand of claim 1, wherein the base is to be coupled to the electronics unit in first manner to support the electronics unit in a vertical orientation or in a second manner to support the electronics unit in a horizonal orientation.

15. An electronics unit (EU) stand comprising:
a base coupled to an electronics unit and extending in a plane; and
a fan carrier supporting a fan having blades extending about a fan hub, the fan carrier being movably coupled to the base to move the fan hub between a first position relative to the base in which the fan hub extends along a first axis perpendicular to the plane and a second position relative to the base in which the fan hub extends along a second axis perpendicular to the plane, wherein the fan is to direct airflow parallel to the first axis and the second axis, wherein the fan carrier or the base comprises a groove formed therein that acts as an airflow passage for airflow moved by the fan.

16. The EU stand of claim 15, wherein the fan carrier is rotatably coupled to the base for movement between the first position and the second position by pivoting about a pivot axis parallel to the first axis and the second axis.

17. The EU stand of claim 15, wherein the fan carrier is rotatably coupled to the base for movement between the first position and the second position by pivoting about a pivot axis nonparallel to the first axis and the second axis.

18. An electronic system comprising:
an electronics unit having heat generating components; and
a stand supporting the electronics unit, the stand comprising:
a base having a perimeter; and
a fan carrier supporting a fan having blades extending about a fan hub, the fan carrier being movably coupled to the base to move the fan hub between a first position within a perimeter of the base and a second position beyond the perimeter of the base wherein the fan carrier or the base comprises a groove formed therein that acts as an airflow passage for airflow moved by the fan.

19. The electronic system of claim 18, wherein the base comprises an opening extending therethrough that acts as an airflow passage, wherein the opening at least partially overlies the fan when the fan carrier is in the first position.

20. The electronics system of claim 18, wherein the base is releasably mounted to the electronics unit.

* * * * *